United States Patent
Ragland et al.

(10) Patent No.: US 9,416,987 B2
(45) Date of Patent: Aug. 16, 2016

(54) HVAC CONTROLLER HAVING ECONOMY AND COMFORT OPERATING MODES

(71) Applicant: Honeywell International Inc., Morristown, NJ (US)

(72) Inventors: Amy Ragland, Brooklyn Center, MN (US); David Quam, Golden Valley, MN (US); Brad Paine, Minnetonka, MN (US)

(73) Assignee: Honeywell International Inc., Morris Plains, NJ (US)

( * ) Notice: Subject to any disclaimer, the term of this patent is extended or adjusted under 35 U.S.C. 154(b) by 423 days.

(21) Appl. No.: 13/952,413

(22) Filed: Jul. 26, 2013

(65) Prior Publication Data

US 2015/0027681 A1    Jan. 29, 2015

(51) Int. Cl.
| | |
|---|---|
| *G06F 19/00* | (2011.01) |
| *F24F 11/00* | (2006.01) |
| *F24D 19/10* | (2006.01) |
| *F24F 5/00* | (2006.01) |
| *G05B 19/042* | (2006.01) |
| *F24D 5/04* | (2006.01) |

(52) U.S. Cl.
CPC ........ *F24F 11/0012* (2013.01); *F24D 19/1084* (2013.01); *F24F 5/0046* (2013.01); *G05B 19/0426* (2013.01); *F24D 5/04* (2013.01); *F24F 2011/0047* (2013.01); *F24F 2011/0064* (2013.01); *F24F 2011/0075* (2013.01); *G05B 2219/25387* (2013.01); *G05B 2219/2614* (2013.01)

(58) Field of Classification Search
CPC .............. F24F 11/0012; F24F 5/0046; G05B 2219/2614

USPC ......................................... 700/276
See application file for complete search history.

(56) References Cited

U.S. PATENT DOCUMENTS

| | | | |
|---|---|---|---|
| 4,186,874 A | 2/1980 | Jensen | |
| 4,228,511 A | 10/1980 | Simcoe et al. | |
| 4,266,599 A | 5/1981 | Saunders et al. | |

(Continued)

FOREIGN PATENT DOCUMENTS

| | | |
|---|---|---|
| CA | 2121247 C | 9/1997 |
| CA | 2289237 A1 | 7/2000 |

(Continued)

OTHER PUBLICATIONS

Ackerly, Katie et al., "Occupant Response to Window Control Signaling Systems: Summary Report," Center for the Built Environment, 28 pages, Apr. 2011.

(Continued)

*Primary Examiner* — Michael D Masinick
(74) *Attorney, Agent, or Firm* — Seager, Tufte & Wickhem, LLP

(57) ABSTRACT

An HVAC controller may be programmed to control an HVAC system according to a comfort mode and an economy mode. When the HVAC system is operating according to the comfort mode, the HVAC system may primarily draw energy from a locally generated energy source or local energy storage system. The HVAC controller may be programmed to transition the HVAC system from operating according to the comfort mode to operating according to an economy mode, wherein the economy mode is a more energy efficient that the comfort mode.

17 Claims, 6 Drawing Sheets

(56) References Cited

U.S. PATENT DOCUMENTS

| | | |
|---|---|---|
| 4,308,911 A | 1/1982 | Mandl et al. |
| 4,338,791 A | 7/1982 | Stamp et al. |
| 4,341,345 A | 7/1982 | Hammer et al. |
| 4,353,409 A | 10/1982 | Saunders et al. |
| 4,442,972 A | 4/1984 | Sahay et al. |
| 4,487,028 A | 12/1984 | Foye et al. |
| 4,567,939 A | 2/1986 | Dumbeck et al. |
| 4,655,279 A | 4/1987 | Harmon et al. |
| 4,702,413 A | 10/1987 | Beckey et al. |
| 4,940,079 A | 7/1990 | Best et al. |
| 4,969,508 A | 11/1990 | Tate et al. |
| 5,062,276 A | 11/1991 | Dudley et al. |
| 5,192,020 A | 3/1993 | Shah et al. |
| 5,197,666 A | 3/1993 | Wedekind et al. |
| 5,259,445 A | 11/1993 | Pratt et al. |
| 5,289,362 A | 2/1994 | Liebl et al. |
| 5,395,042 A | 3/1995 | Riley et al. |
| 5,678,758 A | 10/1997 | Takegawa et al. |
| 5,761,083 A | 6/1998 | Brown, Jr. et al. |
| 5,822,997 A | 10/1998 | Atterbury et al. |
| 5,902,183 A | 5/1999 | D'Souza et al. |
| 5,909,378 A | 6/1999 | De Milleville et al. |
| 6,260,765 B1 | 7/2001 | Natale et al. |
| 6,269,650 B1 | 8/2001 | Shaw |
| 6,298,285 B1 | 10/2001 | Addink et al. |
| 6,478,084 B1 | 11/2002 | Kumar et al. |
| 6,478,233 B1 | 11/2002 | Shah |
| 6,480,803 B1 | 11/2002 | Pierret et al. |
| 6,504,764 B2 | 1/2003 | Tsujikawa et al. |
| 6,536,675 B1 | 3/2003 | Pesko et al. |
| 6,622,926 B1 | 9/2003 | Sartain et al. |
| 6,729,390 B1 | 5/2004 | Toth et al. |
| 6,860,431 B2 | 3/2005 | Jayadev |
| 6,968,295 B1 | 11/2005 | Carr |
| 6,976,366 B2 | 12/2005 | Starling et al. |
| 7,043,341 B2 | 5/2006 | Gallupe et al. |
| 7,089,087 B2 | 8/2006 | Dudley |
| 7,142,112 B2 | 11/2006 | Buckingham et al. |
| 7,261,241 B2 | 8/2007 | Eoga |
| 7,299,996 B2 | 11/2007 | Garrett et al. |
| 7,302,642 B2 | 11/2007 | Smith et al. |
| 7,346,467 B2 | 3/2008 | Bohrer et al. |
| 7,389,159 B2 | 6/2008 | Warren et al. |
| 7,392,661 B2 | 7/2008 | Alles |
| 7,424,868 B2 | 9/2008 | Reckels et al. |
| 7,434,413 B2 | 10/2008 | Wruck |
| 7,454,269 B1 | 11/2008 | Dushane et al. |
| 7,469,550 B2 | 12/2008 | Chapman, Jr. et al. |
| 7,643,908 B2 | 1/2010 | Quirino et al. |
| 7,644,869 B2 | 1/2010 | Hoglund et al. |
| 7,839,275 B2 | 11/2010 | Spalink et al. |
| 7,886,166 B2 | 2/2011 | Shnekendorf et al. |
| 7,886,985 B2 | 2/2011 | Moore et al. |
| 7,904,209 B2 | 3/2011 | Podgorny et al. |
| 7,933,689 B2 | 4/2011 | Warren et al. |
| 7,953,518 B2 | 5/2011 | Kansal et al. |
| 7,992,630 B2 | 8/2011 | Springer et al. |
| 8,063,775 B2 | 11/2011 | Reed et al. |
| 8,078,325 B2 | 12/2011 | Poth |
| 8,091,795 B1 | 1/2012 | McLellan et al. |
| 8,121,734 B2 | 2/2012 | Larsen et al. |
| 8,141,791 B2 | 3/2012 | Rosen |
| 8,165,721 B2 | 4/2012 | Petit |
| 8,185,245 B2 | 5/2012 | Amundson et al. |
| 8,195,335 B2 | 6/2012 | Kreft et al. |
| 8,204,628 B2 | 6/2012 | Schnell et al. |
| 8,219,252 B2 | 7/2012 | Nanami |
| 8,239,066 B2 | 8/2012 | Jennings et al. |
| 8,256,689 B2 | 9/2012 | Matsubara |
| 8,280,556 B2 | 10/2012 | Besore et al. |
| 8,326,466 B2 | 12/2012 | Peterson |
| 8,350,697 B2 | 1/2013 | Trundle et al. |
| 8,364,318 B2 | 1/2013 | Grabinger et al. |
| 8,370,283 B2 | 2/2013 | Pitcher et al. |
| 8,417,388 B2 | 4/2013 | Altonen et al. |
| 8,457,796 B2 | 6/2013 | Thind |
| 8,495,888 B2 | 7/2013 | Seem |
| 8,498,753 B2 | 7/2013 | Steinberg et al. |
| 8,515,584 B2 | 8/2013 | Miller et al. |
| 8,538,586 B2 | 9/2013 | Amundson et al. |
| 8,543,244 B2 | 9/2013 | Keeling et al. |
| 8,555,662 B2 | 10/2013 | Peterson et al. |
| 8,556,188 B2 | 10/2013 | Steinberg |
| 8,560,126 B2 | 10/2013 | Vass et al. |
| 8,560,127 B2 | 10/2013 | Leen et al. |
| 8,880,233 B2 * | 11/2014 | Kearns ................ H02J 3/00 700/295 |
| 2002/0027807 A1 | 3/2002 | Tsujikawa et al. |
| 2004/0177629 A1 | 9/2004 | Eoga |
| 2004/0230344 A1 | 11/2004 | Gallupe et al. |
| 2005/0027907 A1 | 2/2005 | Lee et al. |
| 2005/0279844 A1 * | 12/2005 | Bagwell ............... B08B 15/00 236/49.3 |
| 2006/0038672 A1 | 2/2006 | Schoettle |
| 2006/0065750 A1 | 3/2006 | Fairless |
| 2006/0259219 A1 | 11/2006 | Wakiyama et al. |
| 2007/0156256 A1 | 7/2007 | Jung |
| 2008/0015740 A1 | 1/2008 | Osann |
| 2008/0099570 A1 | 5/2008 | Krebs et al. |
| 2008/0217418 A1 | 9/2008 | Helt |
| 2008/0217419 A1 * | 9/2008 | Ehlers .................. G08B 21/20 236/44 C |
| 2008/0218307 A1 | 9/2008 | Schoettle |
| 2009/0076658 A1 | 3/2009 | Kinnis |
| 2009/0112369 A1 | 4/2009 | Gwerder et al. |
| 2009/0171862 A1 | 7/2009 | Harrod et al. |
| 2009/0307573 A1 | 12/2009 | Lavelle et al. |
| 2009/0308372 A1 | 12/2009 | Nordberg et al. |
| 2010/0025483 A1 | 2/2010 | Hoeynck et al. |
| 2010/0036531 A1 | 2/2010 | Chessel et al. |
| 2010/0070082 A1 | 3/2010 | Chessel et al. |
| 2010/0204834 A1 | 8/2010 | Comerford et al. |
| 2010/0211224 A1 | 8/2010 | Keeling et al. |
| 2010/0235004 A1 * | 9/2010 | Thind ................. G05B 15/02 700/277 |
| 2010/0289643 A1 | 11/2010 | Trundle et al. |
| 2010/0304193 A1 | 12/2010 | Karlsson et al. |
| 2010/0308119 A1 | 12/2010 | Steinberg et al. |
| 2010/0318227 A1 | 12/2010 | Steinberg et al. |
| 2011/0035061 A1 | 2/2011 | Altonen et al. |
| 2011/0046790 A1 | 2/2011 | Miller et al. |
| 2011/0093123 A1 | 4/2011 | Alexanian |
| 2011/0166710 A1 | 7/2011 | Kordik et al. |
| 2011/0168793 A1 | 7/2011 | Kreft et al. |
| 2011/0172831 A1 | 7/2011 | Kreft et al. |
| 2011/0184564 A1 | 7/2011 | Amundson et al. |
| 2011/0184565 A1 | 7/2011 | Peterson |
| 2011/0223850 A1 | 9/2011 | Narayanamurthy et al. |
| 2011/0231020 A1 | 9/2011 | Ramachandran et al. |
| 2011/0237905 A1 | 9/2011 | Kutzik et al. |
| 2011/0257795 A1 | 10/2011 | Narayanamurthy et al. |
| 2011/0264275 A1 | 10/2011 | Thomle et al. |
| 2011/0264286 A1 | 10/2011 | Park |
| 2011/0276527 A1 | 11/2011 | Pitcher et al. |
| 2011/0290893 A1 | 12/2011 | Steinberg |
| 2011/0304295 A1 * | 12/2011 | McNally .............. H01M 10/46 320/101 |
| 2011/0307103 A1 | 12/2011 | Cheung et al. |
| 2012/0006525 A1 | 1/2012 | Lafleur et al. |
| 2012/0009859 A1 | 1/2012 | Wijaya et al. |
| 2012/0016524 A1 | 1/2012 | Spicer et al. |
| 2012/0029725 A1 | 2/2012 | Lafleur et al. |
| 2012/0031984 A1 | 2/2012 | Feldmeier et al. |
| 2012/0066168 A1 | 3/2012 | Fadell et al. |
| 2012/0067561 A1 | 3/2012 | Bergman et al. |
| 2012/0083926 A1 | 4/2012 | Seem |
| 2012/0095601 A1 | 4/2012 | Abraham et al. |
| 2012/0095614 A1 | 4/2012 | DeLayo |
| 2012/0145802 A1 | 6/2012 | Peterson et al. |
| 2012/0158161 A1 | 6/2012 | Cohn et al. |
| 2012/0165993 A1 | 6/2012 | Whitehouse |
| 2012/0169675 A1 | 7/2012 | Moore et al. |
| 2012/0179547 A1 | 7/2012 | Besore et al. |

(56) References Cited

U.S. PATENT DOCUMENTS

| | | | |
|---|---|---|---|
| 2012/0185101 A1* | 7/2012 | Leen | F24F 11/006 700/278 |
| 2012/0186774 A1 | 7/2012 | Matsuoka et al. | |
| 2012/0215366 A1 | 8/2012 | Redmond et al. | |
| 2012/0215759 A1 | 8/2012 | McCoy et al. | |
| 2012/0221151 A1 | 8/2012 | Steinberg | |
| 2012/0226388 A1 | 9/2012 | Evans et al. | |
| 2012/0232700 A1 | 9/2012 | Balmer et al. | |
| 2012/0232702 A1 | 9/2012 | Vass et al. | |
| 2012/0239203 A1 | 9/2012 | Amundson et al. | |
| 2012/0239603 A1 | 9/2012 | Raestik et al. | |
| 2012/0245740 A1 | 9/2012 | Raestik et al. | |
| 2012/0248212 A1 | 10/2012 | Storm et al. | |
| 2012/0253527 A1 | 10/2012 | Hietala et al. | |
| 2012/0259469 A1 | 10/2012 | Ward et al. | |
| 2012/0259470 A1 | 10/2012 | Nijhawan et al. | |
| 2012/0277920 A1 | 11/2012 | Koch | |
| 2013/0013117 A1 | 1/2013 | Desrochers | |

FOREIGN PATENT DOCUMENTS

| | | |
|---|---|---|
| CN | 2605592 Y | 3/2004 |
| CN | 201126229 Y | 10/2008 |
| CN | 101865512 A | 10/2010 |
| CN | 102235728 A | 11/2011 |
| CN | 101825327 B | 3/2012 |
| CN | 102375443 A | 3/2012 |
| CN | 101545667 B | 5/2012 |
| CN | 102022801 B | 11/2012 |
| CN | 101825325 B | 3/2013 |
| EP | 186381 A2 | 7/1986 |
| EP | 286888 A1 | 10/1988 |
| EP | 191801 B1 | 4/1990 |
| EP | 739506 B1 | 1/1999 |
| EP | 1025474 B1 | 11/2002 |
| EP | 1685351 B1 | 1/2009 |
| EP | 2233849 A1 | 9/2010 |
| EP | 2354681 A1 | 8/2011 |
| EP | 1946020 B1 | 5/2012 |
| GB | 2408592 B | 11/2005 |
| GB | 2448896 B | 5/2009 |
| JP | 10009647 A | 1/1998 |
| JP | 2004003759 A | 1/2004 |
| JP | 2005344970 A | 12/2005 |
| JP | 2006118732 A | 5/2006 |
| JP | 2006177646 A | 7/2006 |
| JP | 2006329584 A | 12/2006 |
| JP | 2007172406 A | 7/2007 |
| JP | 2008241151 A | 10/2008 |
| JP | 2009076106 A | 4/2009 |
| JP | 2009180459 A | 8/2009 |
| JP | 2010065937 A | 3/2010 |
| JP | 2010139129 A | 6/2010 |
| JP | 2010151398 A | 7/2010 |
| JP | 2011007366 A | 1/2011 |
| JP | 2011089682 A | 5/2011 |
| JP | 2011153735 A | 8/2011 |
| JP | 2011241990 A | 12/2011 |
| WO | 2007106162 A2 | 9/2007 |
| WO | 2007114985 A2 | 10/2007 |
| WO | 2007126884 A2 | 11/2007 |
| WO | 2011062942 A1 | 5/2011 |
| WO | 2011121299 A1 | 10/2011 |
| WO | 2012013964 A1 | 2/2012 |
| WO | 2012024692 A2 | 2/2012 |
| WO | 2012047938 A2 | 4/2012 |
| WO | 2012048143 A2 | 4/2012 |
| WO | 2012072079 A2 | 6/2012 |
| WO | 2012112494 A1 | 8/2012 |

OTHER PUBLICATIONS

Dourgeois, D. et al., "Hybrid Ventilation os Canadian Non-Domestic Buildings: A Procedure for Assessing IAQ, Comfort and Energy Conservation," ROOMVENT2000, 7th International Conference on Air Distribution, 6 pages, Downloaded Oct. 4, 2012.

Gross, Steven et al., "A Feasibility Study of Natural Ventilation in a Midrise Student Dormitory Building," 12th Conference of International Building Performance Simulation Association, p. 878-885, 2011.

Henze, Gregor et al., "HVAC Control Algorithms for Mixed Mode Buildings," US Green Building Council Green building Research Fund Final Report, 133 pages, May 25, 2012.

* cited by examiner

HVAC CONTROLLER HAVING ECONOMY AND COMFORT OPERATING MODES

TECHNICAL FIELD

The present disclosure relates generally to HVAC controllers, and more particularly to HVAC controllers configured to control environmental conditions within a building in accordance with a comfort mode and an economy mode.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. Depending on the environmental conditions in or around the building, an HVAC systems can consume a significant amount of energy, which is often provided by a gas and/or electric utility. This can be costly. One approach for reducing the energy consumed from a utility is to use other sources of energy, such as locally generated sources and/or an economizer. However, these sources of energy often are not sufficiently reliable or robust to satisfy all of the energy demands of an HVAC system at all times. As such, reliance on a utility for at least some energy is often desirable in order to maintain at least a minimum level of comfort in the building.

SUMMARY

The present disclosure relates generally to HVAC controllers, and more particularly to HVAC controllers configured to control environmental conditions within a building in accordance with a comfort mode and an economy mode.

In example, a building controller may be configured to control an HVAC system of a building including a first mode for heating and/or cooling the building using energy primarily derived locally at the building, and a second mode for heating and/or cooling the building using energy primarily derived from a remote utility. The building controller can include: a memory for storing an economy set point and a comfort set point; an output for providing one or more control signals to the HVAC system; and a controller coupled to the memory and the output. The controller may be configured to control the HVAC system via the one or more control signals in accordance with the comfort set point when operating the HVAC system in the first mode (first mode for heating and/or cooling the building using energy primarily derived locally of the building), and controlling the HVAC system in accordance with the economy set point when operating the HVAC system in the second mode (second mode for heating and/or cooling the building using energy primarily derived from a utility). In many cases, the comfort set point is different than the economy set point.

In another example, a building controller may be configured to control an HVAC system of a building having a first mode for heating and/or cooling the building using energy primarily derived from a local energy storage system local to the building, and a second mode for heating and/or cooling the building using energy primarily derived from a remote energy source that charges for the energy. The building controller can include: a memory for storing an economy set point and a comfort set point; an output for providing one or more control signals to the HVAC system; and a controller coupled to the memory. The controller, when operating the HVAC system in the first mode, may be configured to control the HVAC system via the one or more control signals in accordance with the economy set point until the local energy storage system is charged to at least a threshold level and then control the HVAC system in accordance with the comfort set point. When operating the HVAC system in the second mode, the controller may control the HVAC system in accordance with the economy set point. In many cases, the comfort set point is different than the economy set point.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
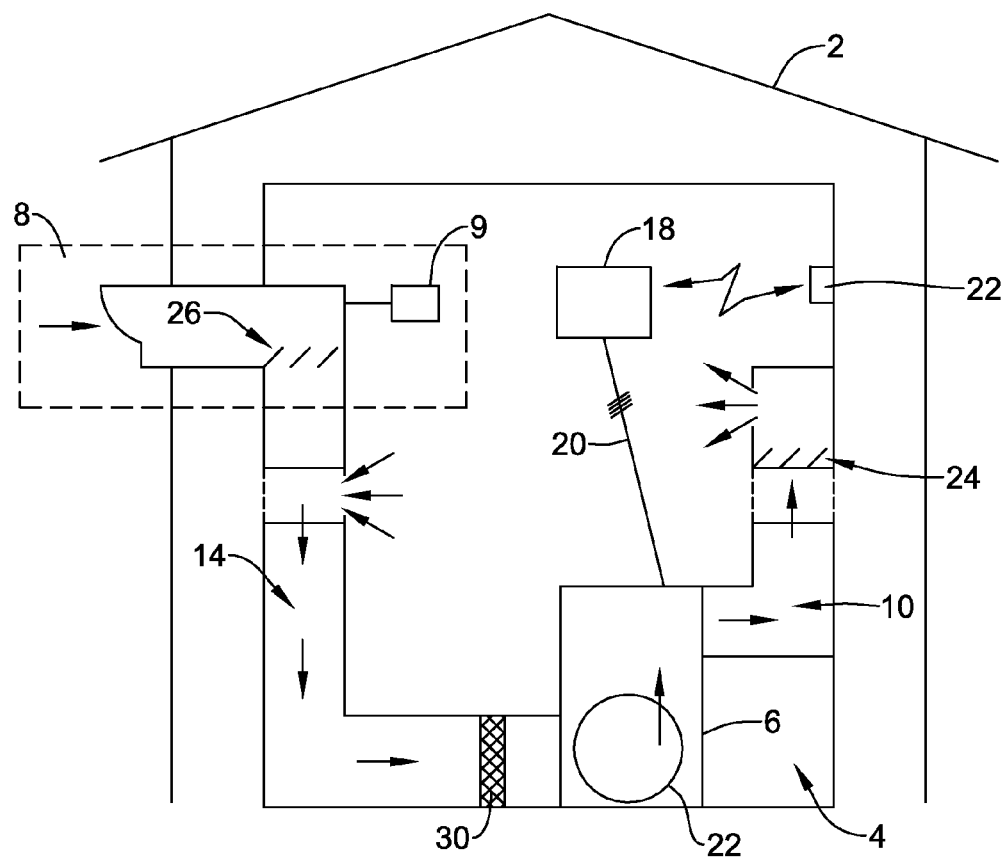
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of an illustrative HVAC system 4 servicing a building or structure 2. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 may include one or more HVAC components 6, a system of ductwork and air vents including a supply air duct 10 and a return air duct 14, and one or more HVAC controllers 18. In some instances, the return air duct 14 may draw air from outside the building or structure 2. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an economizer, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure 2. In some cases, the HVAC system 4 may include an internet gateway or other device that may allow one or more of the HVAC components 6, as described herein, to communicate over a wide area network (WAN) such as, for example, the Internet. In some cases, the gateway device may be integrated into the HVAC controller 18, but this is not required.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. In the example shown, the heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

The system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6. Other dampers 24 for controlling air flow to other zones are not shown in FIG. 1.

In some embodiments, the HVAC controller 18 may operate an economizer 8 to draw outside air into the building or structure 2 to provide low cost cooling as an alternative to mechanical cooling (e.g. compressor), which may lower the overall energy costs of the HVAC system 4. When provided, an economizer 8 may include one or more mechanically-actuated outside air and return air dampers 26, temperature/humidity sensors, and/or an economizer controller 9. These components may act together in such a way as to vary the amount of fresh outside air introduced by the HVAC system 4 into the building for cooling and/or heating the building 2.

The HVAC system 4 may include one or more air filters 30 for removing dust and other pollutants from the air inside the building 2. In the example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may help to protect the HVAC components 6 from dust and other particulate matter that would otherwise be permitted to enter the HVAC component.

Figure 2:
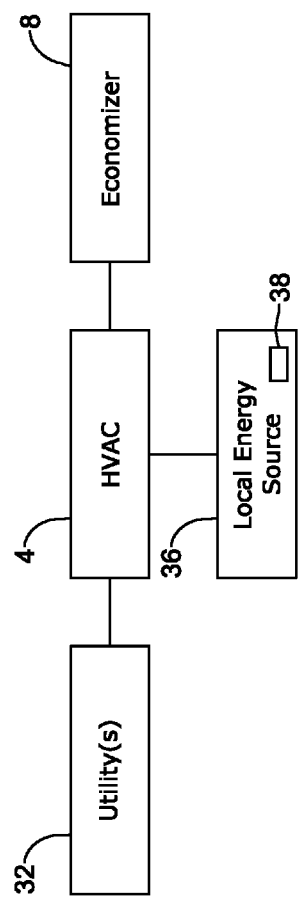
FIG. 2 is a schematic block diagram of different energy sources that may be used to supply energy or free cooling to an illustrative HVAC system.

FIG. 2 is a schematic block diagram of different energy sources that may be used to supply energy and/or low cost cooling to an illustrative HVAC system 4. As shown in FIG. 2, an HVAC system 4 located within a building or structure 2 may derive energy from multiple sources including one or more traditional utilities 32 such as, for example, gas and electric utilities, and/or one or more locally derived energy sources 36. Exemplary locally derived energy sources include, but are not limited to, solar, geothermal, thermal mass, wind, hydroelectric, biomass, and/or the like. In some instances, the locally derived energy source 36 may include an energy storage system 38 for storing energy from the locally derived energy source 36. Exemplary energy storage systems 38 include batteries, capacitors, and/or thermal mass storage devices, as well as any other suitable energy storage device, as desired. The locally derived energy source(s) 36 may recharge the energy storage system 38 when, for example, the energy stores fall below a threshold level.

The energy derived from the local energy source 36 and/or stored by the local energy storage system 38 may be used by the HVAC system 4 to heat and/or cool the building 2. In some cases, the HVAC system 4 may use an economizer 8 to provide low cost cooling and/or heating to the building or structure when conditions are appropriate. Utilizing a local energy source 36 and/or an economizer 8 to heat and/or cool the building may lessen the demand for energy from traditional external or remote energy sources, which may reduce the costs associated with heating and/or cooling the building 2.

In some instances, the HVAC system 4 may be configured to operate according to a first or comfort mode for heating and/or cooling the building that primarily uses energy generated by the local energy source 36 and/or economizer 8. Additionally, the HVAC system 4 may be configured to operate according to a second or economy mode that primarily relies on energy derived from a utility 32. In some cases, the HVAC system 4 may derive energy from a combination of energy sources such as necessary or desired to achieve the desired comfort level or environmental condition with the building or structure. The energy derived from any one of the energy sources or combination of energy sources described herein may be used to operate other appliances and systems located within the building or structure 2 such as, for example, a water heater, a dishwasher, a refrigerator and/or a freezer, lighting systems, a swimming pool pump and/or a swimming pool heater, a humidifier, a dehumidifier, a washer, a clothes dryer, and/or the like.

Figure 3:
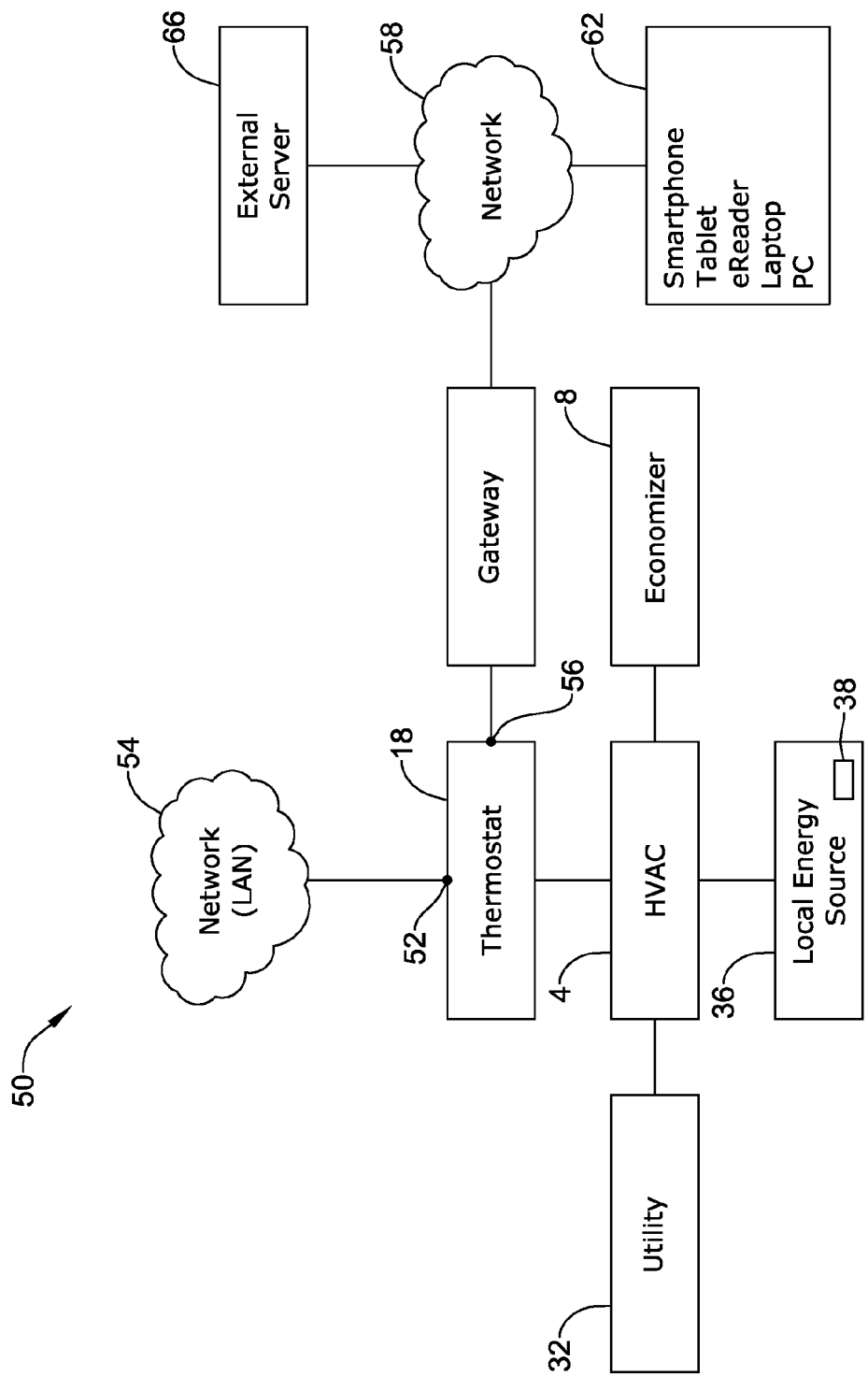
FIG. 3 is a schematic view of an HVAC control system.

FIG. 3 is a schematic view of an illustrative HVAC control system 50 that facilitates remote access and/or control of the HVAC system 4 shown in FIG. 1. The illustrative HVAC control system 50 includes an HVAC controller such as, for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link. As shown in FIG. 3, the HVAC controller 18 may include an input port 52 for communicating with a network 54, such as a wireless local area network (e.g. WiFi, Bluetooth, etc.). In some cases, the input port 52 may be a wireless input port adapted to receive a wireless signal from one or more sensors, one or more mobile devices such as smart phones, tablet computers, and/or any other suitable device.

The HVAC controller 18 may include another port, such as network port 56, that may facilitate communication over one or more wired or wireless networks 58, and that may accommodate remote access and/or control of the HVAC controller 18 via a remote device 62. Depending upon the application and/or where the HVAC user is located, remote access and/or control of the HVAC controller 18 may be provided over the network 58. The network 58 may be a wireless local area network (LAN) or a wide area network (WAN) such as, for example, the Internet. In some cases, a variety of mobile wireless devices 62 may be used to access and/or control the HVAC controller 18 from a remote location (e.g. remote from HVAC Controller 18) over the network 54 and/or network 58 including, but not limited to, mobile phones including smart phones, PDAs, tablet computers, laptop or personal computers, wireless network-enabled key fobs, e-readers and the like. In many cases, the mobile wireless devices 62 may be configured to communicate wirelessly over the network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the network 58 with an external service hosted by one or more external servers 66. A non-limiting example of such an external service is Honeywell's TOTAL CONNECT™ web service. The HVAC controller 18 may be configured to upload selected data via the network 58 to the external web service where it may be collected and stored on the external server 66. In some cases, the data may be indicative of the performance of the HVAC system 4. In other cases, the data may be indicative of a user's energy usage levels under selected environmental conditions, and may include peak demand pricing data provided by one of the utilities 32. Additionally, the HVAC controller 18 may be configured to receive and/or download selected data, settings and/or services including software updates from the external service over the network 58. The data, settings and/or services may be received automatically from the web service, downloaded periodically in accordance with a control algorithm, and/or downloaded in response to a user request. In some cases, the HVAC controller 18 may be configured to receive and/or download an HVAC operating schedule and operating parameter settings such as, for example, comfort and/or economy temperature set points, comfort and/or economy humidity set points, user-specified air-quality parameter thresholds, start times, end times, schedules, window frost protection settings, and/or the like. Additionally, the HVAC controller 18 may be configured to receive local weather data including the current outdoor temperature and/or outdoor humidity, weather alerts and/or warnings, pollen forecast and/or pollen count, smog alert, solar index (e.g. UV index) and/or the like. In some cases, the weather data may be provided by a different external server such as, for example, a web server maintained by the National Weather Service, but this is not required. These are just some examples.

The HVAC system 4 may derive energy from multiple sources including one or more traditional utilities 32 such as, for example, gas and electric utilities, and/or one or more locally derived energy sources 36. Exemplary locally derived energy sources include, but are not limited to, solar, geothermal, thermal mass, wind, hydroelectric, biomass, and/or the like. In some instances, the locally derived energy source 36 may include an energy storage system 38 for storing energy from the locally derived energy source 36. Exemplary energy storage systems 38 include batteries, capacitors, and/or thermal mass storage devices, as well as any other suitable energy storage device, as desired. The energy derived from the local energy source 36 and/or stored by the local energy storage system 38 may be used by the HVAC system 4 to heat and/or cool the building 2. In some cases, the HVAC system 4 may use an economizer 8 to provide low cost cooling and/or heating to the building or structure when conditions are appropriate. Utilizing a local energy source 36 and/or an economizer 8 to heat and/or cool the building may lessen the demand for energy from traditional external or remote energy sources, which may reduce the costs associated with heating and/or cooling the building 2.

In some instances, the HVAC system 4 may be configured to operate according to a first or comfort mode for heating and/or cooling the building that primarily uses energy generated by the local energy source 36 and/or economizer 8. Additionally, the HVAC system 4 may be configured to operate according to a second or economy mode that primarily relies on energy derived from a utility 32.

Figure 4:
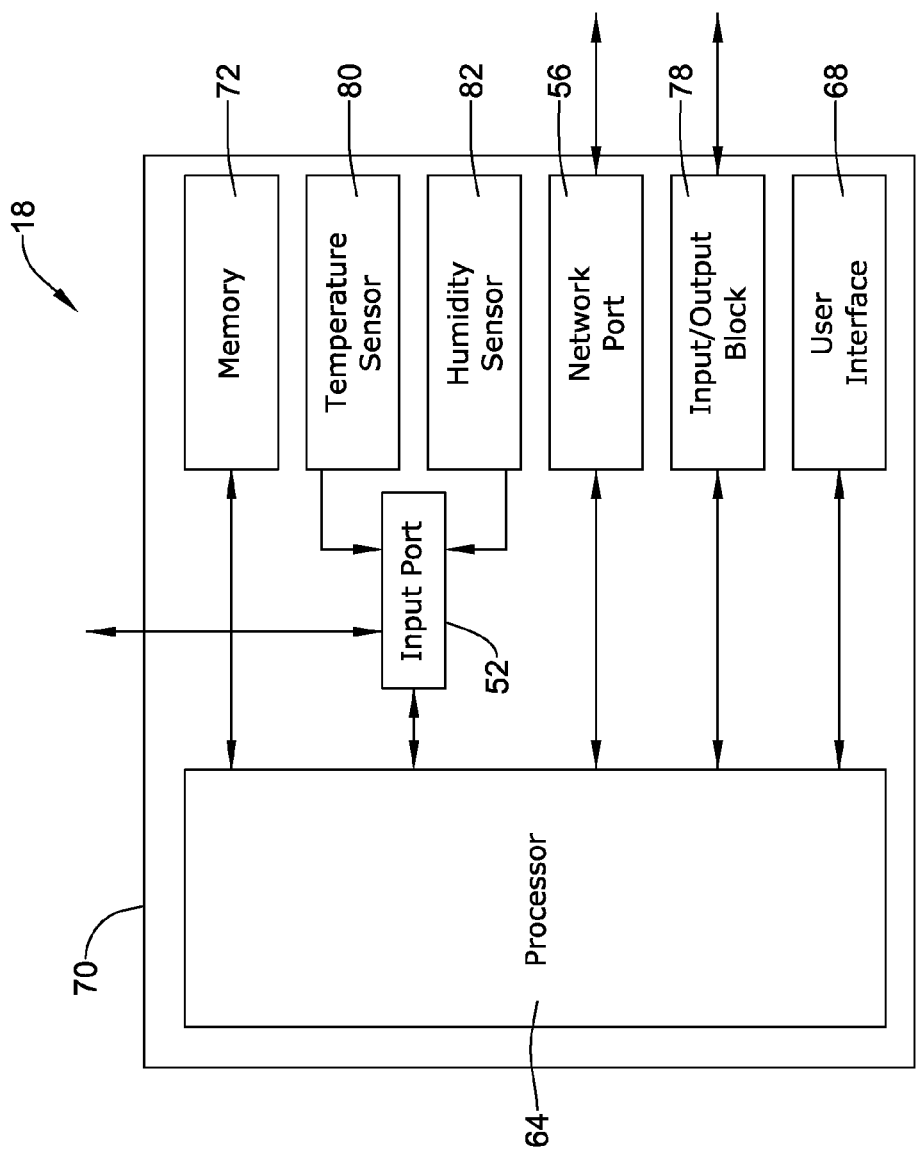
FIG. 4 is a schematic block diagram of an illustrative HVAC controller.

FIG. 4 is a schematic view of an illustrative HVAC controller 18 that may be accessed and/or controlled from a remote location over network 54 and/or network 58 (FIG. 2) using a mobile wireless device 62 such as, for example, a smart phone, a PDA, a tablet computer, a laptop or personal computer, a wireless network-enabled key fob, an e-Reader, and/or the like. In some instances, the HVAC controller 18 may be a thermostat, but this is not required. As shown in FIG. 4, the HVAC controller 18 may include a first communications port 52 for communicating over a network (e.g. wireless LAN) and a second communications port 56 for communicating over a network 58 (e.g. WAN or the Internet). In some cases, the first communications port 52 is a wireless communications port including a wireless transceiver for wirelessly sending and/or receiving signals over network 54. Similarly, the second communications port 56 may be a wireless communications port including a wireless transceiver for sending and/or receiving signals over network 58. In some cases, the second communications port 56 may be in communication with a wired or wireless router or gateway for connecting to the network 58, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 68, but this is not required.

In some instances, HVAC controller 18 may include a timer (not shown). The timer may be integral to the processor 64 or may be provided as a separate component. The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition, the I/O block 78 may communicate with another controller, which is in communication with one or more HVAC components of the HVAC system 4, such as a zone control panel in a zoned HVAC system, equipment interface module (EIM), an economizer controller or any other suitable building control device.

In some cases, the HVAC controller 18 may include an internal temperature sensor 80 and/or internal humidity sensor 82, but this is not required. In some cases, the HVAC controller 18 may communicate with one or more remote temperature sensors, humidity sensors, occupancy and/or other sensors located throughout the building or structure. The HVAC controller may communicate with a temperature sensor and/or humidity sensor located outside of the building or structure for sensing an outdoor temperature and/or humidity if desired.

The user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, economy set points, comfort set points, air-quality parameter thresholds, starting times, ending times, schedule times, diagnostic limits, responses to alerts, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both display and keypad. The touch screen LCD panel may be adapted to solicit values for a number of operating parameters and/or to receive such values, but this is not required. In still other cases, the user interface 68 may be a dynamic graphical user interface.

In some instances, the user interface 68 may not be physically accessible to a user at the HVAC controller 18. Instead, the user interface may be a virtual user interface 68 provided by an application program or "app" executed by a mobile wireless device such as, for example, a smartphone or tablet computer. Such a program may be available for download from an external web service such as, for example, Apple's iTunes, Google's Google Play, and/or Amazon's Kindle Store. Through the application program executed by the mobile wireless device, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, responses to interview questions, and/or the like. In some cases, the user may able to input an economy set point and/or a comfort set point for each of an occupied mode, an unoccupied mode, a sleep mode and/or an away mode of the HVAC system 4.

In other cases, the user interface 68 may be a virtual user interface 68 that is accessible via the network 54 and/or network 58 using a mobile wireless device such as one of those remote devices 62 previously described herein. In some cases, the virtual user interface 68 may include one or more web pages that are transmitted over a network 58 (e.g. LAN or WAN) by an internal web server implemented by the processor 64 of the HVAC controller 18. When so provided, the virtual user interface 68 may be accessed over network 54 and/or network 58 using a mobile wireless device 62 such as any one of those listed above. Through the one or more web pages, the processor 64 may be configured to display information relevant to the current operating status of the HVAC system 4 including the current operating mode, temperature set point, actual temperature within the building, a feels-like temperature, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, responses to interview questions, and/or the like. In some cases, the user may able to input an economy set point and/or a comfort set point for each of an occupied mode, an unoccupied mode, a sleep mode and/or an away mode of the HVAC system 4.

In some cases, the virtual user interface 68 may include one or more web pages that are transmitted over the network 58 (e.g. WAN or the Internet) by an external server (e.g. web server 66). The one or more web pages forming the virtual user interface 68 may be hosted by an external web service and associated with a user account having one or more user profiles. The external server 66 may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the network 58 to the HVAC controller 18 where it is received via the network port 56 and may be stored in the memory 72 for execution by the processor 64. In some cases, the user may able to input an economy set point and/or a comfort set point for each of an occupied mode, an unoccupied mode, a sleep mode and/or an away mode of the HVAC system 4.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

The processor 64 may operate in accordance with an algorithm that controls or at least partially controls one or more HVAC components 6 of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm, including the control set points, may be stored locally in the memory 72 of the HVAC controller 18 and, in some cases, may be received from an external web service over the network 58. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service over the second network. In some cases, the control algorithm may include settings such as set points.

The processor 64 may be configured to operate the HVAC system 4 according to an economy mode having an economy set point and a comfort mode having a comfort set point for heating and/or cooling the building. The economy set point and the comfort set point may include a temperature set point and/or a humidity set point, and may be stored locally in the memory 72 of the HVAC controller 18. The economy set point may differ from the comfort set point, and may be a more energy efficient set point. For example, when in a cooling mode, an economy temperature set point may be greater than a comfort temperature set point. Similarly, an economy humidity set point may be greater than a comfort humidity set point. The economy set point, whether it is a temperature set point and/or a humidity set point, may be a more energy efficient set point than the comfort set point and, as a result, may cause the HVAC system 4 to operate in a more energy efficient manner by lessening HVAC system's demand for energy from traditional utilities. In some cases, the processor 64 may operate the HVAC system 4 according to an economy set point or a comfort set point in any one of an occupied period, an unoccupied period, a sleep period, and/or a vacation period.

In some cases, the processor 64 may be configured to transition the HVAC system 4 from the comfort mode to the economy mode in accordance with a predetermined operating schedule, in response to one or more predetermined environmental conditions, in anticipation of certain environmental conditions as indicated by a weather forecast, in response to a user's request, and/or in response to a command received from a utility such as, for example, utility 32. This transition may be a gradual transition, a step transition, a step transition with hysteresis, or any other transition as desired.

The HVAC system 4, when operating in a comfort mode according to a comfort set point as commanded by the processor 64, may be configured to primarily draw energy from one or more locally derived energy sources 36, local energy storage systems 38, and/or operate an economizer 8, as discussed herein. The HVAC system 4, when operating in a comfort mode according to a comfort set point, may use greater than 50% of energy derived locally. In some instances, the HVAC system 4, when operating in a comfort mode according to a comfort set point, may use greater than 60%; greater than 70%; greater than 80%; or greater than 90% of energy derived locally. In many cases, the processor 64 may be programmed to operate the HVAC system 4 in the comfort mode if heating and/or cooling the building can be accomplished using energy primarily derived and/or stored locally. In some cases, the processor 64 may be configured to operate the HVAC system 4 according to the comfort mode for a predetermined amount of time and/or during certain times of the day such as, for example, when the demand placed on the utility 32 may be the greatest and/or the cost of the energy may be the highest.

In some instances, where the HVAC system 4 may derive energy from a local energy storage system 38, the HVAC system 4 may continue to primarily draw energy from the local energy storage system 38 until the energy stores are depleted below a threshold level and the system requires recharging from the local energy source 36. At that point, the processor 64 may send one or more control signals via the input/output block 78 causing the HVAC system 4 to transition to operating according to an economy mode having an economy set point in which the HVAC system 4 may draw energy primarily from a utility that charges for energy usage. In the economy mode, the HVAC system 4 may use greater than 50%; greater than 60%; greater than 70%; greater than 80%; or greater than 90% of energy derived from a utility that charges for energy usage (such as a gas and/or electric utility).

Figure 5:
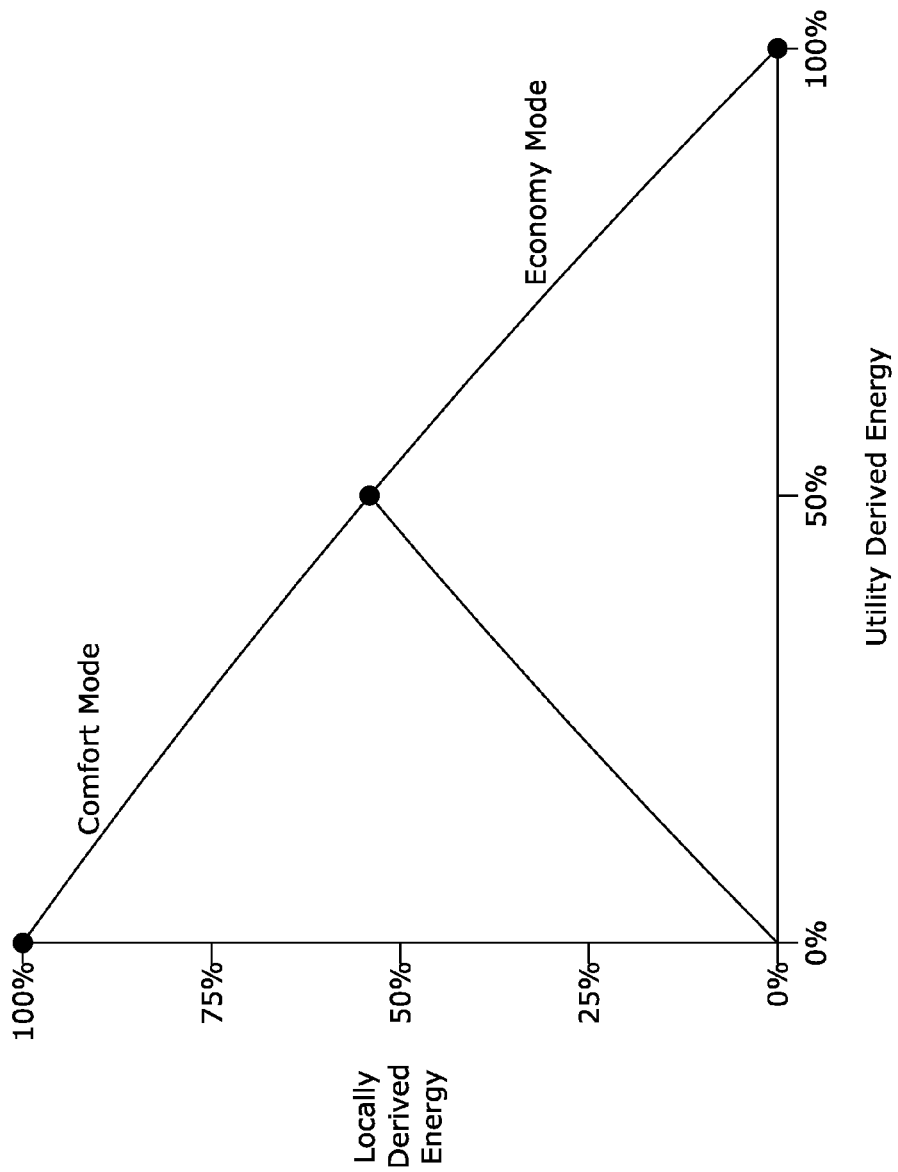
FIG. 5 is graphical representation of a relationship between an amount of energy derived from a locally energy source and an amount of energy derived from a utility.

FIG. 5 shows an illustrative relationship between an amount of energy that may be derived locally and that amount of energy that may be derived from a utility (such as a gas or electric utility). As can be seen from FIG. 5, when in the comfort mode, the HVAC system 4 may derive greater than 50% of its energy used to heat and/or cool the building from a local energy source and/or local energy storage system. Similarly, when in the economy mode, the HVAC system may derive greater than 50% of its energy used to heat and/or cool the building from a utility. Notably, and in some instances, when in the economy mode, the HVAC system 4 may still derive at least some of its energy from a locally derived energy source. Likewise, when in the comfort mode, the HVAC system 4 may still derive at least some of its energy from a locally derived energy source (e.g. electricity to power a fan and/or dampers of an economizer).

In some instances, the processor 64 may be programmed to monitor the local energy source 36 and/or local energy storage system 38, and may determine when the local energy storage system 38 is charged to a least a predetermined threshold level. In some cases, the predetermined threshold level may be dependent upon the weather forecast and/or other data. For example, the warmer or colder the air temperature, the greater the demand is on the heating and/or cooling system, which may cause the predetermined threshold level to be increased. Upon determining that the local energy storage system 38 is charged at or above the predetermined threshold level, the processor 64 may send one or more control signals via the input/output block 78 to the HVAC system 4 causing the HVAC system 4 to transition from the economy mode of operation, having a more energy efficient set point, to the comfort mode of operation having a less energy efficient but more comfortable set point. The HVAC system 4 may also transition from drawing energy primarily from a utility to drawing energy primarily from the local energy source in accordance with the change in operating mode. Depending on the local energy generation, the processor 64 may transition the HVAC system 4 between the economy mode and the comfort mode to maintain an overall desired level of comfort in the building or structure. Relying primarily on a locally derived energy source to operate the HVAC system 4 in the comfort mode may provide a more cost effective way to maintaining the comfort level within the building or structure, while reducing the cost of energy usage from a utility when the local energy generation is not adequate to maintain the comfort set point.

In some cases, the processor 64 may be programmed to operate the HVAC system 4 in accordance with an anticipation set point. The anticipation set point may, in some cases, be different from the economy set point and the comfort set point. In some cases, the processor 64 may operate the HVAC system 4 in accordance with the anticipation set point to pre-cool or pre-heat the building or structure 2 if, for example, weather forecast data received by the HVAC controller 18 indicates that energy savings could be achieved in the future by pre-heating and/or pre-cooling the building or structure. Such forecast can be used to improve savings on systems that have local energy storage capacity by using control algorithms to decide whether to store excess locally generated energy for future use or to use it to increase comfort.

A min/max may be provided to limit the amount of energy that is stored. For example on a cool summer night to be followed by a hot summer day, the processor 64 may bring in cool outside air using the economizer 8 to a minimum temperature set point in order to store up for the following day. If the following day is not expected to be a hot day, the processor 64 may just cool the building down to the normal comfort set point. Thus, it is contemplated that the anticipation set point may be adjustable, depending on the conditions.

The HVAC system 4, when operating in accordance with an anticipation set point, may primarily use energy derived and/or stored locally. For example, the HVAC system 4 may use greater than 50% of energy derived locally when controlling to the anticipation set point. In some cases, when the local energy source is depleted below a threshold level, the processor 64 may send an output signal to the HVAC system via the input/output block 78 to cause the HVAC system 4 to draw energy from a utility to continue pre-heating and/or pre-cooling the building until the anticipation set point has been achieved. Again, relying primarily on a locally derived and/or stored energy to operate the HVAC system 4 in accordance with an anticipation set point to pre-heat and/or pre-cool the building or structure may provide a more cost effective way to maintain the comfort level within the building or structure, and may reduce anticipated future demand for energy from a utility.

In some cases, regardless of the operating mode (economy or comfort), the processor 64 may be programmed to prioritize use of a local energy source over the use of a traditional utility that charges for energy use. In one instance, regardless of whether the set point is an economy set point or a comfort set point, the processor 64 may operate the HVAC system 4 such that the HVAC system 4 primarily draws energy from the local energy source 36 and/or local energy storage system 38 until the energy stores are depleted below a threshold level and the system requires recharging. At that point, the processor 64 may send one or more control signals via the input/output block 78 causing the HVAC system 4 to transition from drawing energy from the local energy source 36 and/or local energy storage system 38 to drawing energy from a utility that charges for energy usage. The processor 64 may be further programmed to monitor the local energy source 36 and/or local energy storage system 38, and may determine when the local energy storage system 38 is charged to a least a predetermined threshold level sufficient to supply energy to the HVAC system 4 for a sufficient length of time. At that point, the processor 64 may send one or more signals to the HVAC system 4 via the input/output block 78 to cause the HVAC system 4 to once again draw energy from the local energy source. The processor 64 may continue to transition the HVAC system 4 between relying on a local energy source, including locally stored energy, and relying on a utility to maintain an overall desired level of comfort in the building or structure.

In other cases, regardless of the operating mode (economy or comfort), the processor 64 may prioritize use of low cost heating and/or cooling over operating the HVAC system 4 to heat and/or cool the building or structure. In one instance, the processor 64 may be programmed to operate an economizer such as, for example, economizer 8 shown in FIG. 1 to achieve a desired level of cooling within the building or structure. If the processor 64 determines that the amount of cooling provided by the economizer 8 is insufficient to meet the cooling demands of the building or structure, the processor 64 may operate the HVAC system 4 as a backup or supplement to achieve the desired level of cooling.

In another instance, the processor 64 may be programmed to monitor the amount of heat stored by, for example, a thermal mass that may be used to provide low cost heating to the building or structure. Heat stored in the thermal mass may be released to heat the building or structure. In some cases, if the processor 64 determines the amount of heat generated by the thermal mass is insufficient to meet the heating demands of the building or structure or that the thermal mass has discharged substantially all of the heat stored therein, the processor 64 may operate the HVAC system 4 as a backup or supplement to achieve the desired level of heating. The processor 64 may continue to monitor the amount of heat stored in the thermal mass. Upon determining that the amount of heat stored in the thermal mass or other heat storage device has reached a threshold level, the processor 64 may send an output signal via the input/output block to the HVAC system 4 to use heat from the thermal mass to provide heating. It will be generally understood that a thermal mass may also be used to provide low cost cooling to a building or structure during a cooling season.

Figure 6:
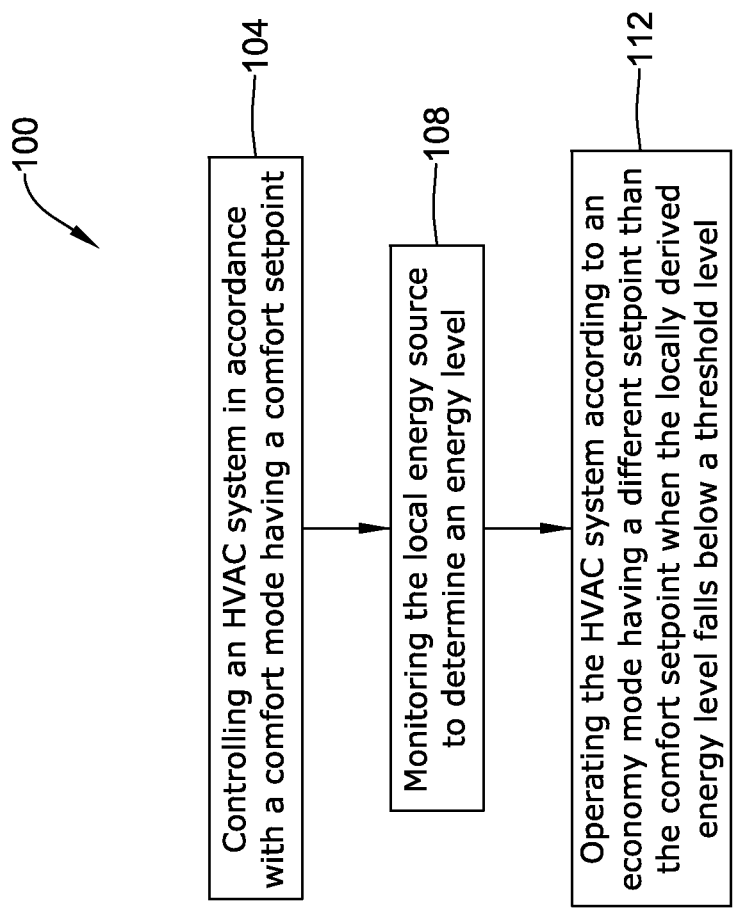
FIG. 6 is a flow chart of a method of controlling an HVAC system of a building.

FIG. 6 is a flow chart of a method 100 that may be used to control an HVAC system 4 to heat and/or cool a building or structure 2. The HVAC system 4 may be configured to operate according to a first mode in which the HVAC system 4 uses energy primarily derived locally at the building, and a second mode in which the HVAC system 4 uses energy primarily derived from a utility that charges for energy usage (such as a gas or electric utility). In some instances, when operating in the first mode, the HVAC system 4 may use a source of low cost cooling and/or low cost heating.

In the first mode, an HVAC controller 18, such as described herein, may transmit one or more signals to the HVAC system 4 to operate the HVAC system according to a comfort set point (Block 104). The comfort set point may be determined by the user, and in some cases may be entered by the user via a user interface of HVAC controller 18. The HVAC controller 18 may monitor the local energy source to determine its current energy level (Block 108). Upon determining that the energy level associated with the local energy source has fallen below a threshold level, the HVAC controller 18 may transmit one or more signals to the HVAC system 4 to operate the HVAC system 4 according to an economy set point that may be more energy efficient than the comfort set point (Block 112). In some cases, the HVAC controller 18 may continue to monitor the local energy source to determine its energy level, and when the energy level is once again sufficient to operate the HVAC system 4 according to the first mode, the HVAC controller 18 may transition the HVAC system 4 back to the first mode of operation. The transition may be a gradual transition, a step transition, a step transition with hysteresis, or any other transition as desired.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed

What is claimed is:

1. A building controller for controlling an HVAC system of a building, the building controller comprising:
   a memory for storing an economy set point and a comfort set point, wherein the comfort set point is different from the economy set point;
   an output for providing one or more control signals to the HVAC system;
   an input for receiving forecast data from a remote location; and
   a controller coupled to the memory and the output, the controller configured to control the HVAC system via the one or more control signals in accordance with a first mode for heating and/or cooling the building using energy primarily derived locally at the building, and a second mode for heating and/or cooling the building using energy primarily derived from a remote utility, the controller configured to control the HVAC system via the one or more control signals in accordance with the comfort set point when operating the HVAC system in the first mode, and controlling the HVAC system in accordance with the economy set point when operating the HVAC system in the second mode, the controller further configured to control the HVAC system in accordance with an anticipation set point, which is different from the economy set point and the comfort set point, when operating the HVAC system in the first mode if it is indicated, based at least in part on the forecast data, that energy savings could be achieved in the future.

2. The building controller of claim 1, wherein, in the first mode, the HVAC system operates an economizer to use energy derived from air outside of the building to heat and/or cool the building.

3. The building controller of claim 1, wherein, in the first mode, the HVAC system uses locally generated solar energy to heat and/or cool the building.

4. The building controller of claim 1, wherein, in the first mode, the HVAC system uses locally stored energy to heat and/or cool the building.

5. The building controller of claim 4, wherein the locally stored energy includes locally stored solar energy.

6. The building controller of claim 4, wherein the locally stored energy includes energy derived from a thermal mass.

7. The building controller of claim 1, wherein the controller is configured to operate in the first mode if the heating and/or cooling of the building can be accomplished using energy primarily derived locally.

8. The building controller of claim 1, wherein in the first mode, the HVAC system derives at least some energy from the remote utility, but less than in the second mode.

9. The building controller of claim 1, wherein the first mode uses greater than 50% of energy derived locally.

10. The building controller of claim 1, wherein the first mode uses greater than 70% of energy derived locally.

11. The building controller of claim 1, wherein the first mode uses greater than 80% of energy derived locally.

12. The building controller of claim 1, wherein the first mode uses greater than 90% of energy derived locally.

13. A building controller for controlling an HVAC system of a building, the building controller comprising:
    a memory for storing an economy set point and a comfort set point, wherein the comfort set point is different than the economy set point;
    an input for receiving weather forecast data;
    an output for providing one or more control signals to the HVAC system; and
    a controller coupled to the memory and the output, the controller configured to control the HVAC system in a first mode for heating and/or cooling the building using energy primarily derived from a local energy storage system local to the building, and a second mode for heating and/or cooling the building using energy primarily derived from a remote energy source that charges for the energy, wherein:
        when operating the HVAC system in the first mode, the controller is configured to control the HVAC system via the one or more control signals in accordance with the economy set point until the local energy storage system is charged to at least a threshold level and then control the HVAC system in accordance with the comfort set point, wherein the threshold level is dependent on the received weather forecast data; and
        when operating the HVAC system in the second mode, controlling the HVAC system in accordance with the economy set point.

14. The building controller of claim 13, wherein the local energy storage system include a battery that is charged by one or more of solar and wind energy.

15. The building controller of claim 13, wherein the local energy storage system include a heat storage device.

16. A method for controlling an HVAC system of a building, the method comprising:
    receiving weather forecast data;
    selecting a first mode or a second mode for operating the HVAC system for heating and/or cooling the building, wherein in the first mode the HVAC system uses energy primarily derived locally of the building, and in the second mode the HVAC system uses energy primarily derived from a utility;
    when operating the HVAC system in the first mode, controlling the HVAC system via the one or more control signals in accordance with a comfort set point;
    when operating the HVAC system in the second mode, controlling the HVAC system in accordance with an economy set point, wherein the comfort set point is different than the economy set point; and
    transitioning from the first mode to the second mode when the energy derived locally of the building falls below a threshold level, wherein the threshold level is dependent on the received forecast data.

17. The method of claim 16, wherein the economy set point is a more energy efficient set point than the comfort set point.

* * * * *